US012691738B2

(12) United States Patent
Zhao et al.

(10) Patent No.: US 12,691,738 B2
(45) Date of Patent: Jul. 28, 2026

(54) SEMI-EMBEDDED BED COVER FOR A PICKUP TRUCK

(71) Applicant: Yinli Zhao, Suzhou City (CN)

(72) Inventors: Yinli Zhao, Suzhou City (CN); Yingjie Sun, Suzhou City (CN)

(73) Assignee: Yinli Zhao, Suzhou City (CN)

( * ) Notice: Subject to any disclaimer, the term of this patent is extended or adjusted under 35 U.S.C. 154(b) by 626 days.

(21) Appl. No.: 18/181,910

(22) Filed: Mar. 10, 2023

(65) Prior Publication Data

US 2024/0300311 A1      Sep. 12, 2024

(51) Int. Cl.
| | |
|---|---|
| *B60J 7/14* | (2006.01) |
| *B60J 7/16* | (2006.01) |
| *B60J 7/19* | (2006.01) |

(52) U.S. Cl.
CPC ............. *B60J 7/141* (2013.01); *B60J 7/1607* (2013.01); *B60J 7/198* (2013.01)

(58) Field of Classification Search
CPC ........... B60J 7/0084; B60J 7/141; B60J 7/198
See application file for complete search history.

(56) References Cited

U.S. PATENT DOCUMENTS

| | | | | | |
|---|---|---|---|---|---|
| 11,180,010 | B1 * | 11/2021 | Xu | .......................... | B60J 7/0084 |
| 11,186,151 | B1 * | 11/2021 | Xu | ............................. | B60P 7/04 |

| | | | | | |
|---|---|---|---|---|---|
| 11,235,650 | B2 * | 2/2022 | Gu | .............................. | B60P 7/02 |
| 11,247,543 | B1 * | 2/2022 | Lin | .......................... | B60J 7/198 |
| 11,299,021 | B2 * | 4/2022 | Dylewski, II | ............ | B60J 7/198 |
| 11,890,921 | B2 * | 2/2024 | Qiu | .......................... | B60J 7/198 |
| 12,157,356 | B2 * | 12/2024 | Fu | .............................. | B60J 7/141 |
| 12,251,997 | B2 * | 3/2025 | Qiu | .......................... | B60J 7/141 |
| 12,257,888 | B2 * | 3/2025 | Chen | ....................... | H02S 20/30 |
| 12,269,328 | B2 * | 4/2025 | Xu | .............................. | B60J 7/104 |
| 2021/0053427 | A1 † | 2/2021 | Gu | | |
| 2021/0061079 | A1 † | 3/2021 | Sun | | |
| 2021/0379973 | A1 † | 12/2021 | Fu | | |
| 2023/0079111 | A1 * | 3/2023 | Bao | .............................. | B60J 5/14 |
| | | | | | 160/133 |
| 2024/0174064 | A1 * | 5/2024 | Dylewski, II | ............ | B60J 7/141 |
| 2024/0198772 | A1 * | 6/2024 | Cai | ........................ | B60J 7/1607 |
| 2024/0286470 | A1 * | 8/2024 | Wang | ....................... | B60J 7/141 |
| 2024/0286471 | A1 * | 8/2024 | Wang | ....................... | B60J 7/141 |
| 2024/0286473 | A1 * | 8/2024 | Liu | ........................ | B60J 7/1607 |
| 2024/0300308 | A1 * | 9/2024 | Chen | ....................... | B60J 7/141 |
| 2024/0308310 | A1 * | 9/2024 | He | .......................... | B60J 7/198 |
| 2024/0384736 | A1 * | 11/2024 | Zheng | ...................... | B60P 7/02 |
| 2024/0408946 | A1 * | 12/2024 | Zheng | ...................... | B60J 7/141 |
| 2025/0128582 | A1 * | 4/2025 | Xu | .............................. | B60J 7/141 |
| 2025/0206114 | A1 * | 6/2025 | Zheng | ...................... | B60J 7/198 |
| 2025/0249734 | A1 * | 8/2025 | Thompson | ............... | B60J 7/141 |
| 2025/0256786 | A1 * | 8/2025 | Zheng | .................. | B62D 33/044 |
| 2025/0256787 | A1 * | 8/2025 | Zheng | .................. | B62D 33/044 |
| 2025/0269705 | A1 * | 8/2025 | Zheng | ...................... | B60J 7/141 |
| 2025/0269707 | A1 * | 8/2025 | Zheng | ...................... | B60J 7/198 |

* cited by examiner
† cited by third party

*Primary Examiner* — Jason S Morrow

(57)      ABSTRACT

A semi-embedded bed cover for a pickup truck, including a panel body connected to the cargo hopper, the panel body is connected to the cargo hopper by a dual linkage lock system and a guide rail support bar system, the panel body includes a front railing.

8 Claims, 12 Drawing Sheets

A

721

722

SEMI-EMBEDDED BED COVER FOR A PICKUP TRUCK

TECHNICAL FIELD

This invention is relevant to automobile accessories, especially a semi-embedded bed cover for a pickup truck.

BACKGROUND TECHNOLOGY

The cargo hopper of the pickup truck (also known as a sedan truck) is often used to carry goods. Since the cargo hopper is open, people invented the bed cover to avoid wetting the goods in the cargo hopper in rainy and snowy weather. Install the bed cover on the pickup truck's cargo hopper and use the cover to prevent the goods in the cargo hopper from getting wet by rain.

Current structure of the bed cover as described below, using hinges and other structures to install several reversible bed cover panels in a frame, but there are still gaps between the cover, water droplets will still penetrate the cargo hopper from the gap, and the bed cover is an external structure, which often has poor consistency with the cargo hopper.

ABOUT THE INVENTION

The purpose of the present invention is to provide a semi-embedded bed cover, which, by improving the structure of the cover, results in better consistency and better waterproofing.

In order to solve the above-mentioned problems of the prior art, the technical solution adopted in the present invention is described.

A semi-embedded bed cover includes a panel body connected to a cargo hopper, the panel body is connected to the cargo hopper by a dual linkage lock system and a guide rail support bar system, the panel body includes a large front bar, a first panel, a second panel and a third panel, one end of the first panel is connected to the large front bar, the other end of the first panel is connected to a second panel by a rotating shaft system, the second panel is connected to the third panel by a rotating shaft system, the end of the third panel away from the second panel is connected to a rear bar with lock system.

The guide rail support bar system is connected to the cargo hopper.

The rotating shaft system includes an intermediate bar and two rotating bars, the two rotating bars are rotatably connected to the intermediate bar, the rotating bars are used for connecting the panel body, the rotating bars include a clamping end for connecting the panel body and a rotating end for connecting the intermediate bar, the rotating end is provided with a hook-shaped arc surface and a rotating bar arc surface, the hook-shaped arc surface is connected to the rotating end through the rotating bar arc surface, the intermediate bar is provided with a rotating groove and a limiting surface, the rotating bar arc surface extends into the rotating groove, the hook-shaped arc surface is provided inside the rotating groove.

By setting the rotating bar and the intermediate bar, can ensure the rotating bar and the intermediate bar form relative rotation, and the profile splicing structure adopted by the two bars has a good waterproof effect.

Further, the dual linkage lock system is used to connect the panel with the guide rail support bar system, the dual linkage lock system includes a profile connected to the panel body, the profile is provided with a profile groove, both ends of the profile groove are connected to a lock bolt assembly, the two lock bolt assemblies are connected to each other by a steel wire rope, the lock bolt assembly includes a locating block, a spring, a lock, a handle ring and a handle base, the handle base and locating block are respectively connected to the profile, the handle ring is slidingly connected to the handle base, the lock is slidingly connected to the profile groove, both ends of the spring are connected to the lock and the locating block, both ends of the steel wire rope are connected to two lock bolts, the steel wire rope is wrapped around the handle ring, by providing two lock bolt assemblies, both ends of the steel wire rope are respectively connected to two locks bolt, the mobile steel wire rope can drive the two lock bolts to shrink at the same time, then the panel body can be opened. The handle base is provided with two connecting holes, the handle ring is provided with a restriction groove and two wire passing holes, the two wire passing holes are respectively arranged at both ends of the restriction groove, the connecting holes and wire passing holes are provided one by one in correspondence.

Further, the lock includes a locking end and a connecting end, the locking end includes a bulge and a lock bolt bevel, the connecting end is provided with a mounting hole, the locating block is provided in the mounting hole, the locating block is connected with a circular shaft, the spring is sleeved to the circular shaft. By setting the circular shaft, the spring can be sleeved on the circular shaft to ensure that the spring remains horizontal and provides sufficient tension, the natural length of the spring should be longer than the circular shaft to avoid the circular shaft against the connecting end, resulting in the lock unable to shrink, both left and right ends of the panel body are connected with a longitudinal side rail system, by providing a longitudinal side rail system, can not only achieve a good waterproof effect, but also makes the bed cover more integral and consistent. The guide rail support bar system includes a guide rail, a clamping unit and a front bar fixing block, the clamping unit is used for connecting the guide rail to the edge of the cargo hopper, the front bar fixing block bears the guide rail by screws to play a fixed and locating role, by setting up the guide rail support bar system, the guide rail can be connected to the edge of the cargo hopper, thus facilitating the connection between the panel and the cargo hopper. The front bar fixing block includes a connecting portion and a restriction portion, the connecting portion is connected to the guide rail support surface by screws, the restriction portion is stuck to the large front bar. By connecting the large front bar and the guide rail through the front bar fixing block, the connection of the guide rail is more stable and free from shaking during use.

Further, the guide rail support bar system further includes a support bar, a support bar fixing block and a fixing bracket, the support bar is connected to the guide rail through the support bar fixing block, the fixing bracket is connected to the guide rail, the fixing bracket snaps into the middle of the support bar, the support bar is connected to a mounting end at the end away from the support bar fixing block, the support bar fixing block includes a first clamping piece and a second clamping piece, the first clamping piece and the second clamping piece clamp the guide rail, the first clamping piece and the second clamping piece are connected by bolts, the bottom of the first clamping piece is connected with a tightening screw, the tightening screw is used to tighten the second clamping piece, through the support rod fixing block, one end of the support bar can pass through the support bar fixing block and be rotatably connected to the guide rail, the other end of the support bar can be raised or lowered through rotation.

Further, the guide rail is provided with a clamping groove and a guide rail support surface, the clamping groove is used to fit with the clamping unit to make the connection of the guide rail more stable, the support surface for connecting the guide rail rubber strip, the end of the support surface away from the clamping groove is provided with an upward hook to fit with the lock bolt bevel, the hook can not only play a role in limiting and protecting the guide rail rubber strip, but also make the bed cover more convenient to close. When closing, the lock bolt bevel contacts the hook, as both are bevel, the hook squeezes the lock bolt to make the lock bolt shrink first. When the whole lock bolt passes through the hook, lock bolt reset under the action of spring, then the guide rail support surface limits the lock bolt. The clamping unit includes a first clamping block, a second clamping block and a tightening screw, the first clamping block and second clamping block are located on both sides of the guide rail, the first clamping block and the second clamping block are connected to each other by bolts, the second clamp block is "L" shaped, the tightening screw is connected to the bottom of the second clamp block and against the first clamp block, the large front bar is connected to a support pad.

The beneficial effects of the invention are that a large front rail, a rotating shaft system, a rear rail locking system, and a longitudinal side rail system formed a closed bed cover, which will not leak water easily, the appearance is almost flat with the cargo hopper, with high aesthetics.

In the Figure: 1—Panel body; 11—First panel; 12—Second panel; 13—Third panel; 2—Rotating shaft system; 21—Rotating bar; 2101—Hook-shaped arc surface; 22—Intermediate bar; 2201—Rotating groove; 2202—Limiting surface; 3—Rear bar with lock system; 4—Large front bar; 5—Supporting pad; 6—Dual linkage lock system; 61—Locating block; 612—Mounting hole; 62—Spring; 63—Lock; 631—Bulge; 632—Lock bolt bevel; 65—Handle ring; 651—Wire passing hole; 66—Handle base; 662—Connecting hole; 67—Profile groove; 68—Steel wire rope; 7—Guide rail support bar system; 71—Guide rail; 712—Clamping groove; 713—Guide rail supporting surface; 72—Front bar fixing block; 721—Connecting portion; 722—restriction portion; 73—Clamping unit; 731—First clamping block; 732—Second clamping block; 733—Tightening screw; 74—Support bar; 75—Mounting end; 77—Fixing bracket; 7—Support bar fixing block; 781—First clamping piece; 782—Second clamping piece; 783—Tightening screw; 79—Guide rail rubber strip; 8—Longitudinal side rail system.

THE CONCRETE METHOD TO CARRY OUT

The following instruction further explains the invention's concrete implementation method.

In order to enable a clearer understanding of the above-mentioned objects, features and advantages of the present invention, the invention is described in detail below in connection with the accompanying drawings and specific embodiments. It should be noted that the embodiments of the present application and the features in the embodiments can be combined with each other without conflict.

The terms "first," "second," "third," etc. are only used to differentiate the description and should not be understood as indicating or implying relative importance.

In the description of the invention, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, the meanings of the above terms in the present invention can be understood in specific situations.

The specific embodiments of the present invention will be described in detail below in connection with the accompanying drawings. It should be understood that the specific embodiments described herein are intended only to illustrate and explain the present invention and are not intended to limit it.

Embodiment 1

Figure 1:
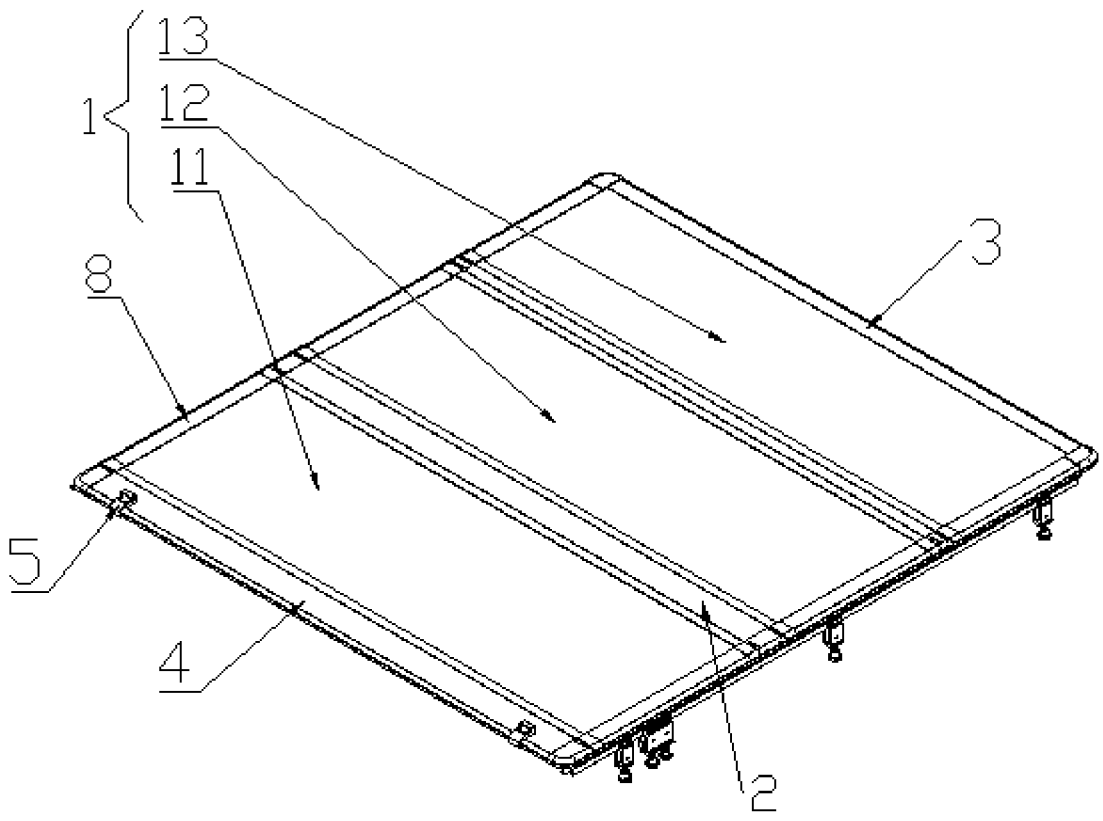
FIG. 1 is a structure schematic diagram 1 of the present invention.
Figure 2:
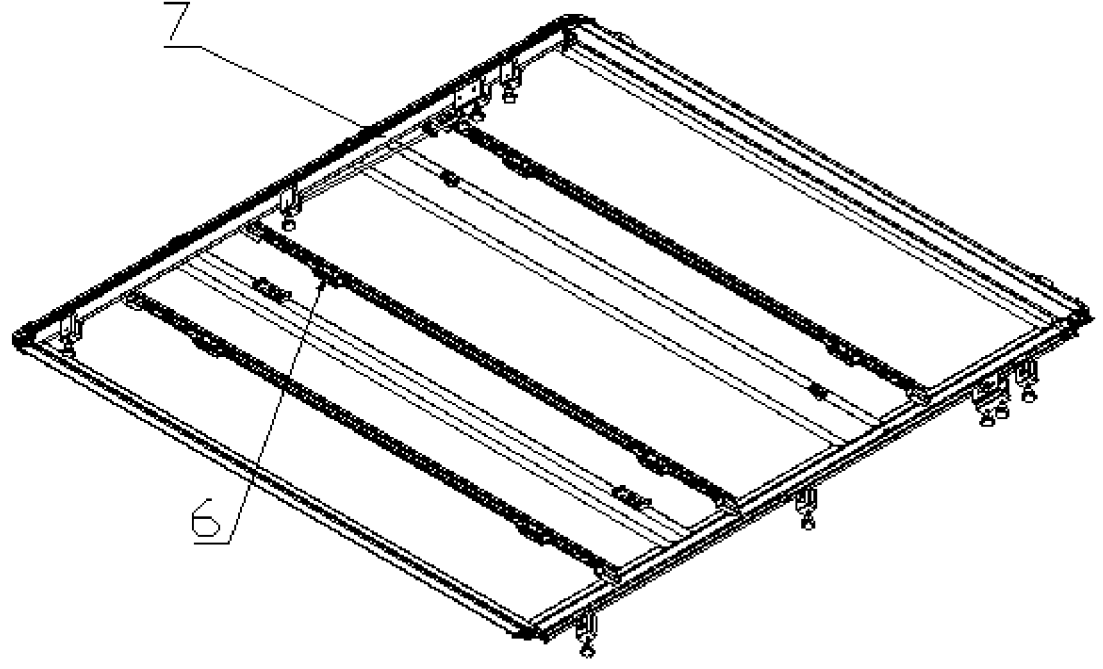
FIG. 2 is a structure schematic diagram 2 of the present invention.
Figure 3:
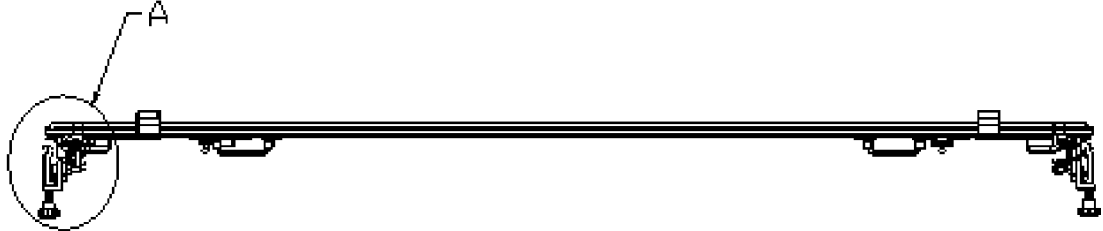
FIG. 3 is a structure schematic diagram 3 of the present invention.
Figure 4:
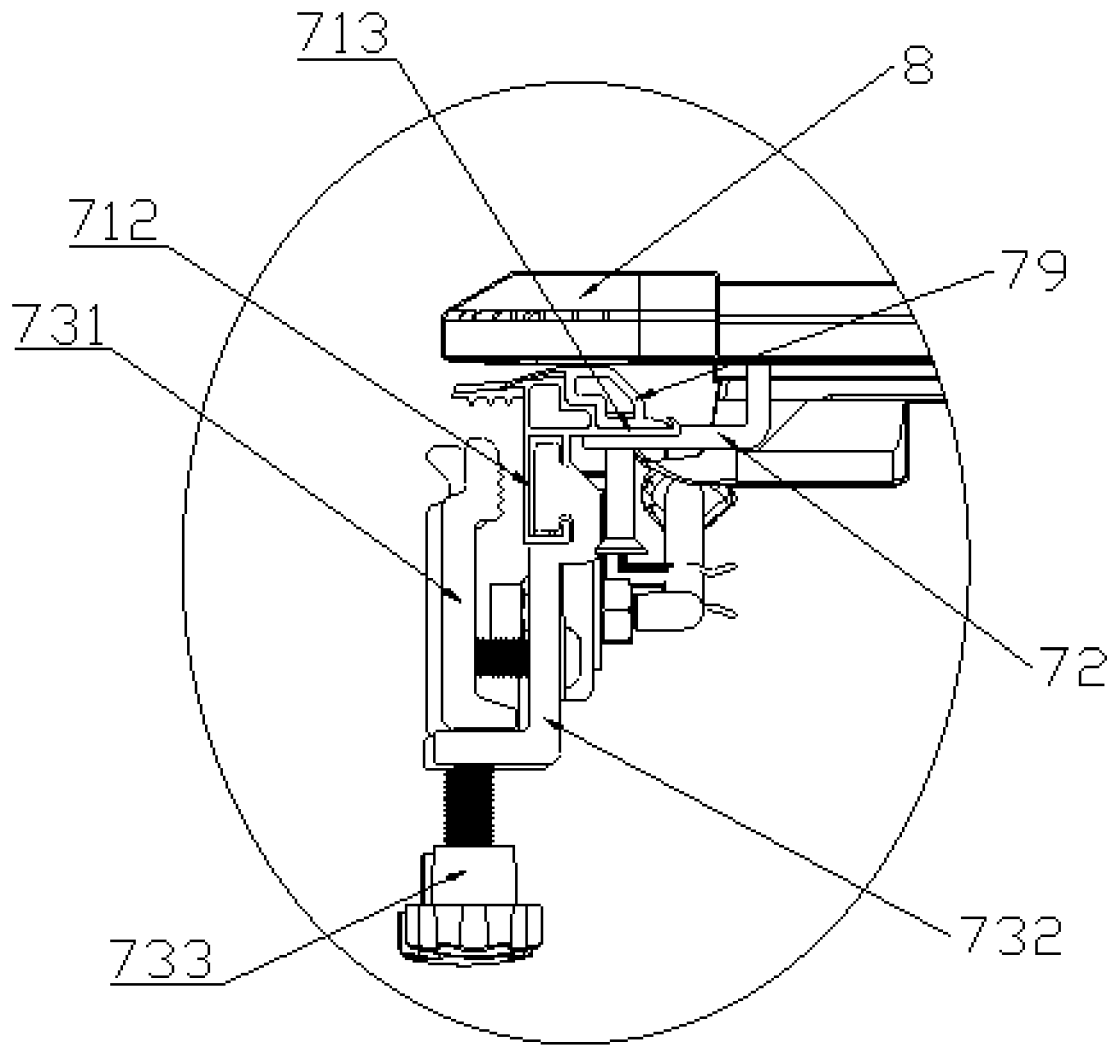
FIG. 4 is a partial enlarged view of part A in FIG. 3.
Figure 5:
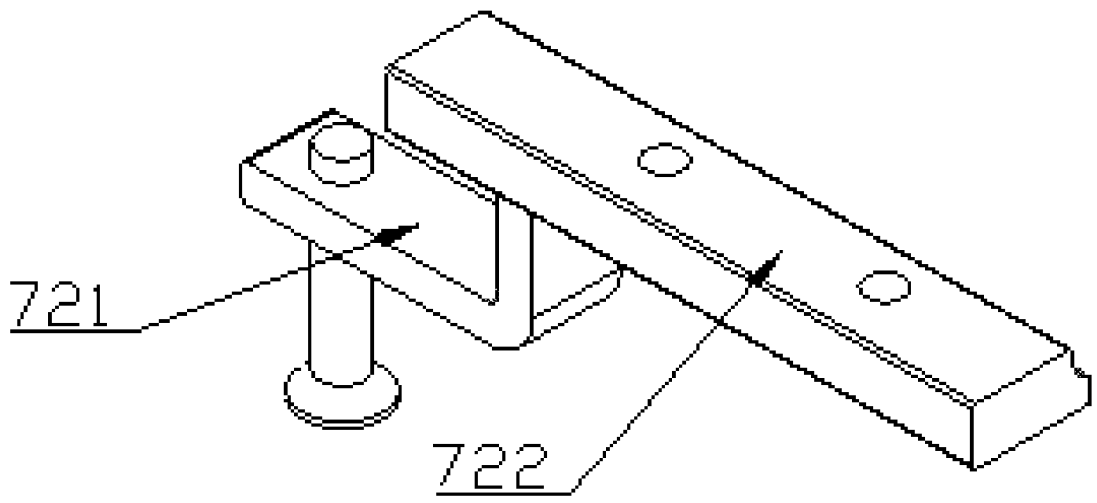
FIG. 5 is a structure schematic diagram of the front bar fixing block in the present invention.
Figure 6:
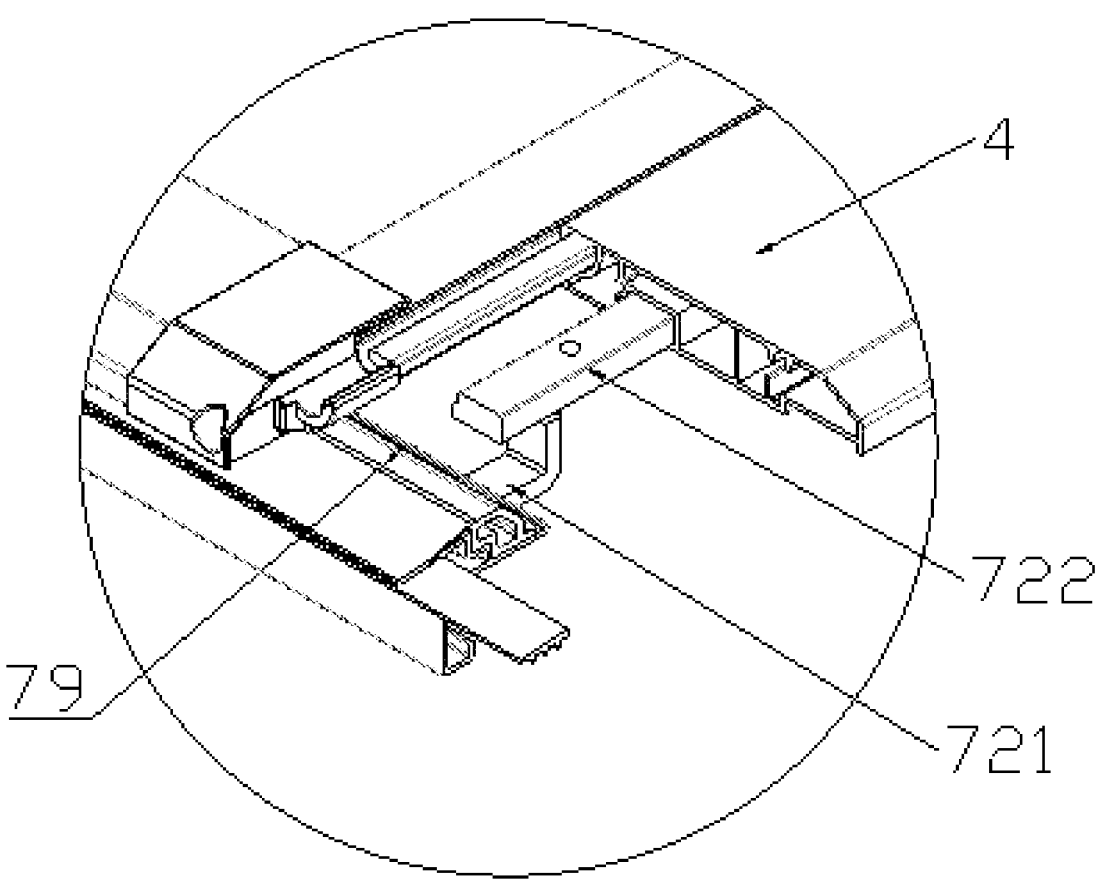
FIG. 6 is a schematic diagram 1 of the connection of the front rail fixing block in the present invention.
Figure 7:
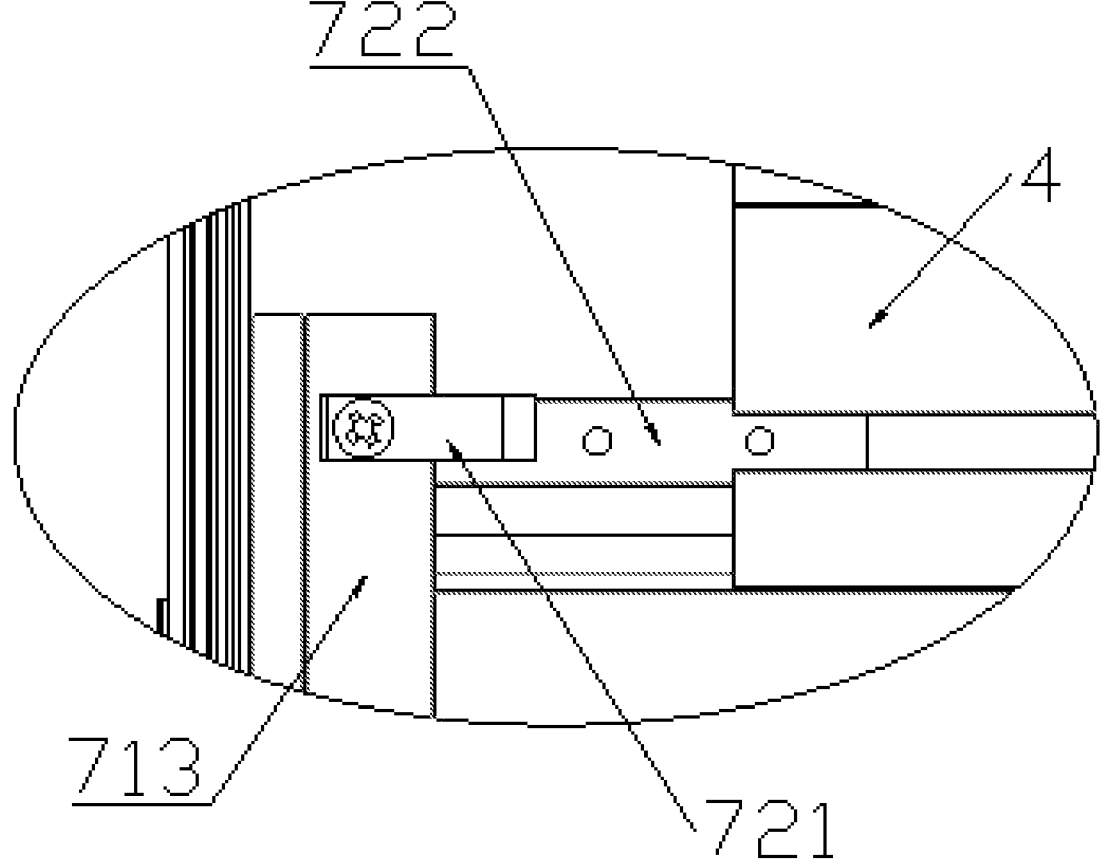
FIG. 7 is a schematic diagram 2 of the connection of the front rail fixing block in the present invention.
Figure 8:
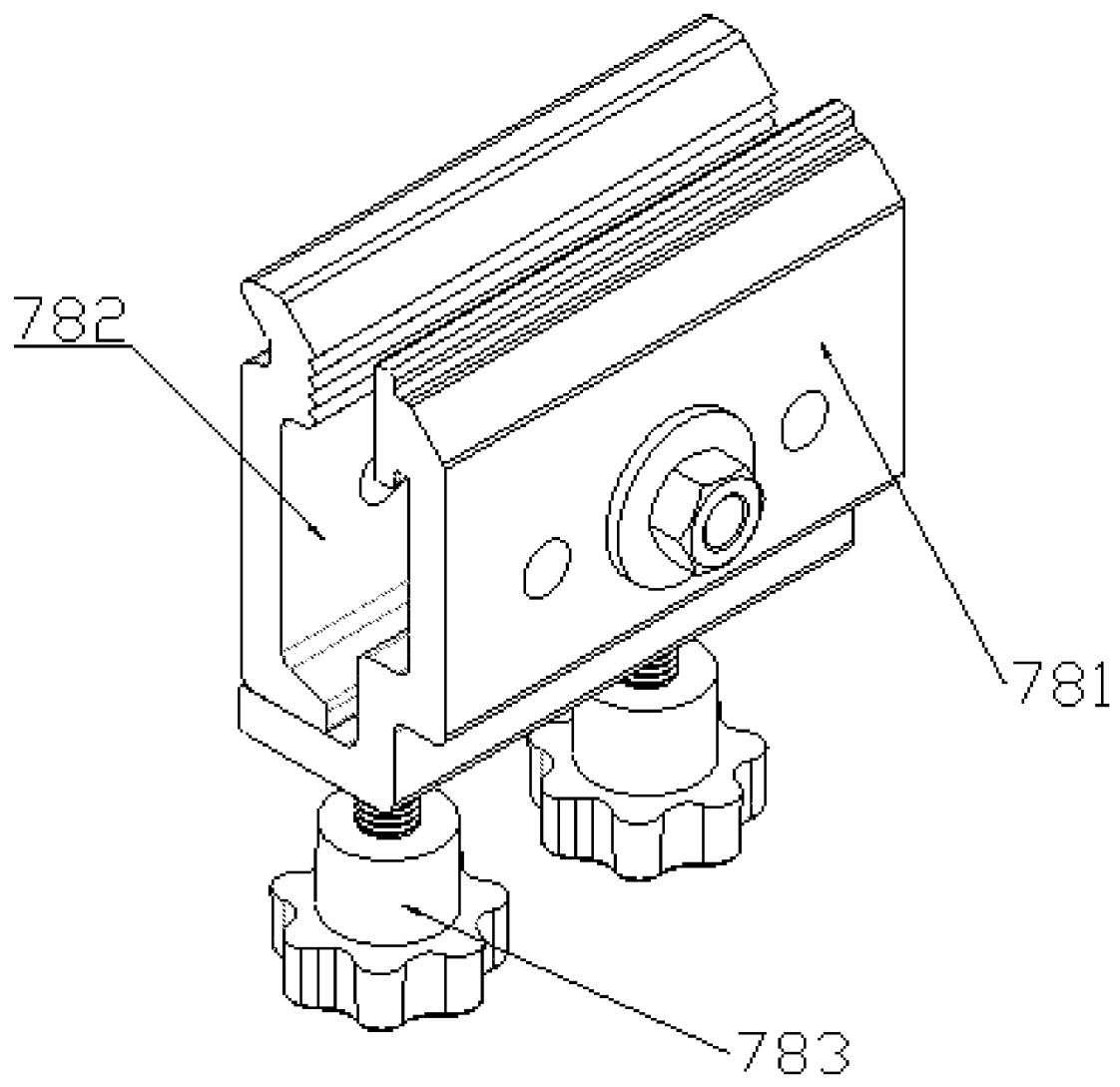
FIG. 8 is a schematic diagram of the connection of the support bar fixing block in the present invention.
Figure 9:
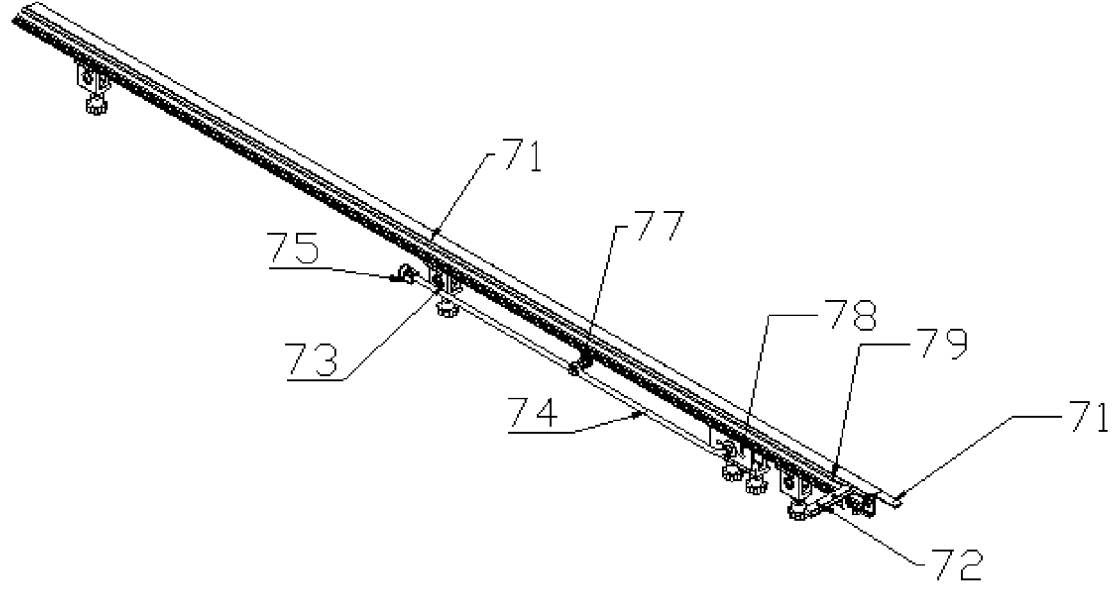
FIG. 9 is a structure schematic diagram of the guide rail support bar system in FIG. 2
Figure 10:
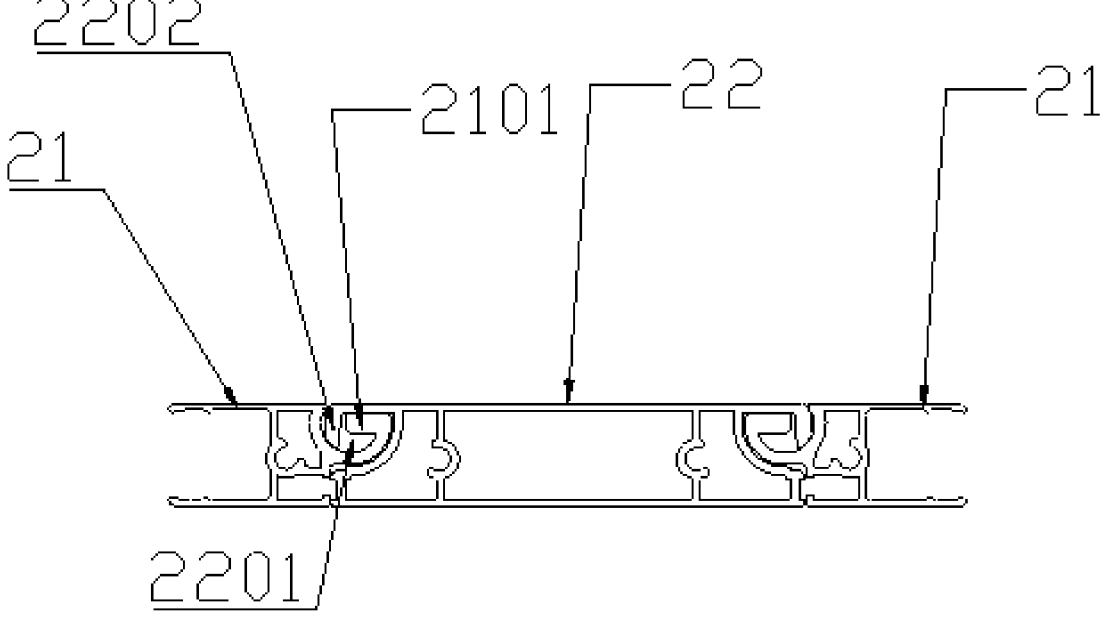
FIG. 10 is a structure schematic diagram of the rotating shaft system in FIG. 1.
Figure 11:
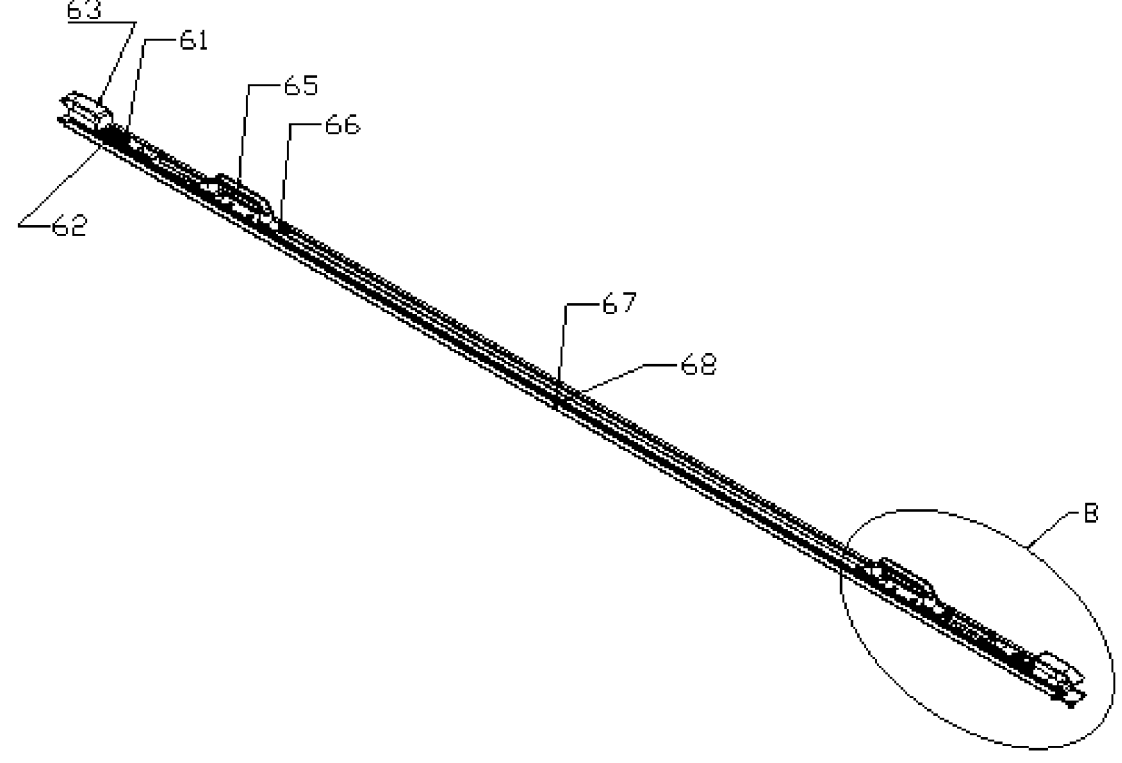
FIG. 11 is a structure schematic diagram of the dual linkage lock system in FIG. 2
Figure 12:
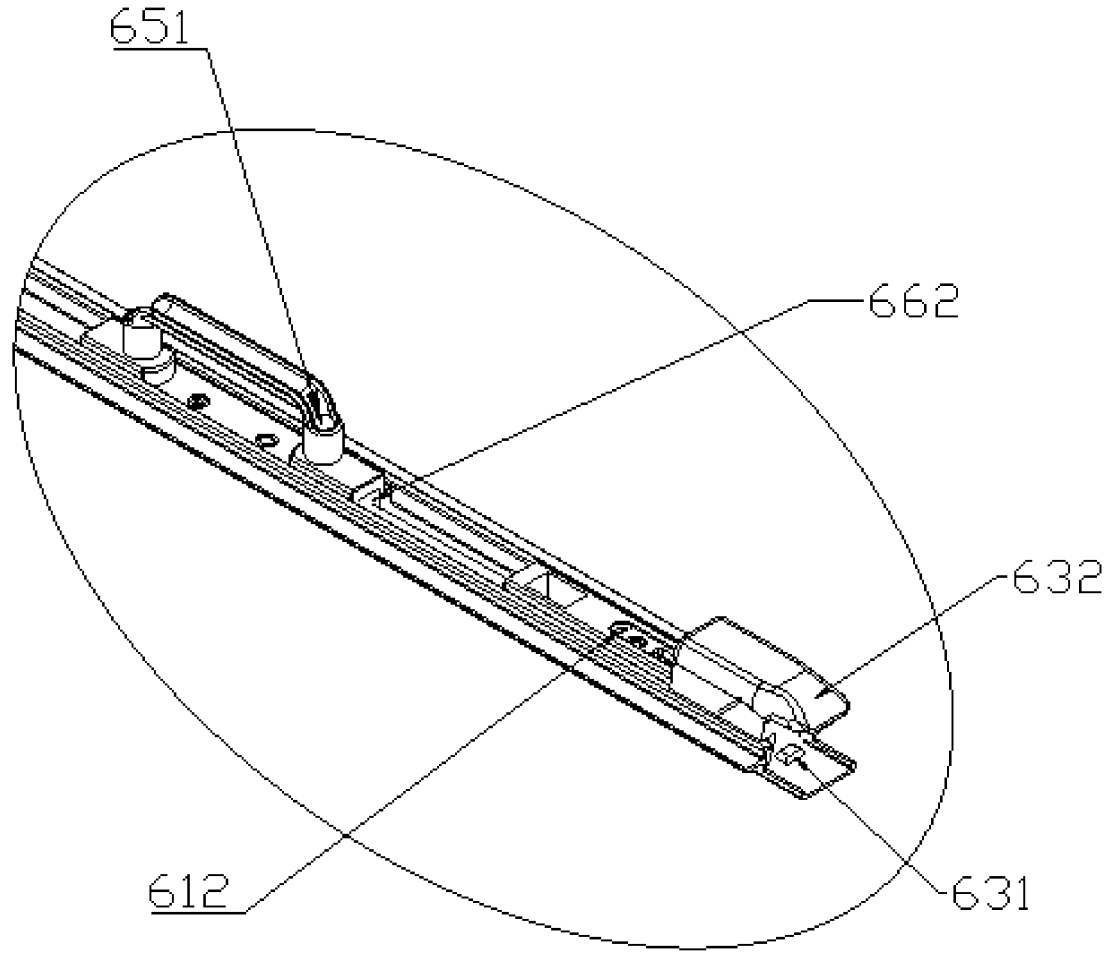
FIG. 12 is a partial enlarged view of part B in FIG. 11.

As shown in FIGS. 1, 2 and 6, a semi-embedded bed cover includes a panel body 1 connected to a cargo hopper, the panel body 1 is connected to the cargo hopper by a dual linkage lock system 6 and a guide rail support bar system 7, the panel body 1 includes a large front bar 4, a first panel 11, a second panel 12 and a third panel 13, one end of the first panel 11 is connected to the large front bar 4, the other end of the first panel 11 is connected to the second panel 12 through a rotating shaft system 2, the second panel 12 is connected to the third panel 13 through a rotating shaft system 2, the end of the third panel 13 away from the second panel 12 is connected to a rear bar with lock system 3.

The guide rail support bar system 7 is connected to the cargo hopper.

The rotating system 2 includes intermediate bar 22 and two rotating bars 21, the two rotating bars 21 are rotatably connected to intermediate bar 22, the rotating bars 21 are used for connecting the panel body 1, the rotating bars 21 include a clamping end to connected the panel body 1 and a rotating end to connect the intermediate bar 22, the rotating end is provided with a hook-shaped arc surface 2101 and a rotating bar arc surface 21, the hook-shaped arc surface 2101 is connected to the rotating end through the rotating bar arc surface 21, the intermediate bar 22 is provided with a rotating groove 2201 and a limiting surface 2202, the rotating bar 21 arc surface extends into the rotating groove 2201, the hook-shaped arc surface 2101 is provided inside the rotating groove 2201.

By setting the rotating bar 21 and the intermediate bar 22, can ensure the rotating bar 21 and the intermediate bar 22 form relative rotation, and at the same time, the profile splicing structure adopted by the two bars has a good waterproof effect.

When in use, rotate the panel body 1 to make the rotating rod 21 rotate relative to the intermediate rod 22. When the included angle between the rotating rod 21 and the intermediate rod 22 is less than 90°, the limiting surface 2202 contacts the hook-shaped arc surface 2101 to generate resistance to rotation.

Embodiment 2

On the basis of Embodiment 1, as shown in FIG. 7, 9-12, the dual linkage lock system 6 is used to connect the panel body 1 with the guide rail support bar system 7, the dual linkage lock system 6 includes a profile connected to the panel body 1, the profile is provided with a profile groove 67, both ends of the profile groove 67 are connected to a lock bolt assembly, the two lock bolt assemblies are connected to each other by a steel wire rope 68, the lock bolt assembly includes a locating block 61, a spring 62, a lock 63, a handle ring 65 and a handle base 66, the handle base 66 and the locating block 61 are respectively connected to the profile, the handle ring 65 is slidingly connected to the handle base 66, the lock bolt 63 is slidingly connected in the profile groove 67, both ends of the spring 62 are respectively against the lock bolt 63 and the locating block 61, both ends of the steel wire rope 68 are respectively connected to the two locks 63, the steel wire rope 68 is wrapped around the handle ring 65.

By providing two lock bolt assemblies, both ends of the steel wire rope 68 are connected to the two locks 63, the mobile steel wire rope 68 can drive the two locks 63 to shrink at the same time, then the panel body 1 can be opened.

The handle base 66 is provided with two connecting holes 662, the handle ring 65 is provided with a restriction groove and two wire passing holes 651, the two wire passing holes 651 are respectively arranged at both ends of the restriction groove, the connecting holes 662 and wire passing holes 651 are provided one by one in correspondence.

When installing, the steel wire rope 68 insert through the connecting hole 662, then pass through one of the wire passing hole 651 and the restriction groove, then another wire passing hole 651, and finally passes through the other connecting hole 662.

When using, pull the handle ring 65 to make the handle ring 65 away from the handle base 66, when the handle ring 65 pull the steel wire rope 68, the steel wire rope 68 drives the lock 63 to shrink, then the panel body 1 opened. Compared with the existing manual lock, setting the handle ring 65 is more convenient for the user to grasp and exert force, and is more ergonomic.

The lock 63 includes a locking end and a connecting end, the locking end includes a bulge 631 and a lock bolt bevel 632, the connecting end is provided with a mounting hole 612, the locating block 61 is provided in the mounting hole 612, the locating block 61 is connected with a circular shaft, the spring 62 is sleeved on the circular shaft.

By providing a circular shaft, the spring 62 can be sleeved on the circular shaft to ensure that the spring 62 remains horizontal and provides sufficient tension, the natural length of the spring 62 should be longer than the circular shaft to avoid the circular shaft against the connecting end, resulting in the lock bolt 63 unable to shrink.

The lock bolt is designed as a bevel, which makes it more convenient to close the cover. Users only need to press the cover, the beveled structure of the lock bolt can automatically shrink after touching the profile, and when the lock bolt passes through the profile, it is reset by the spring 62 to lock the cover tightly.

Embodiment 3

On the basis of Embodiment 2, as shown in FIGS. 3-5 and 8, both left and right ends of the panel body 1 are connected with a longitudinal side bar system 8.

By providing a longitudinal side rail system 8, it can not only achieve a good waterproof effect, but also makes the bed cover more integral and consistent.

The guide rail support bar system 7 includes a guide rail 71, a clamping unit 73 and a front bar fixing block 72, the clamping unit 73 is used for connecting the guide rail 71 to the edge of the cargo hopper, the front bar fixing block 72 is connected to the guide rail 71 by screw to play a fixed and locating role, using a screw to connect the front bar fixing block 72 and the guide rail 71 makes the connection more stable and not easy to slide.

The front bar fixing block 72 includes a connecting portion 721 and a restriction portion 722, the connecting portion 721 is connected to the guide rail support surface 713 by screws, the restriction portion 722 is stuck to the large front bar 4.

By connecting the large front bar 4 and the guide rail 71 through the front bar fixing block 72, the connection of the guide rail 71 is more stable and free from shaking during use.

By setting the guide rail support bar system 7, the guide rail 71 can be connected to the edge of the cargo hopper, thus facilitating the connection between the panel body 1 and the cargo hopper.

The guide rail support bar system 7 further includes a support bar 74, a support bar fixing block 78, and a fixing bracket 77, the support bar 74 is connected to the guide rail 71 through the support bar fixing block 78, the fixing bracket 77 is connected to the guide rail 71, the fixing bracket 77 snaps into the middle of the support bar 74.

The end of the support bar 74 away from the support bar fixing block 78 is connected to a mounting end 75.

The support bar fixing block 78 includes a first clamping piece 781 and a second clamping piece 782, the first clamping piece 781 and the second clamping piece 782 clamp the guide rail 71, the first clamping piece 781 and the second clamping piece 782 are connected by bolt, the bottom of the first clamping piece 781 is connected with a tightening screw 783, the tightening screw 783 is used to tighten the second clamping piece 782.

Through the support bar fixing block 78, one end of the support bar 74 can pass through the support bar fixing block 78 and be rotatably connected to the guide rail 71, the other end of the support bar 74 can be raised or lowered through rotation.

The guide rail 71 is provided with a clamping groove 712 and a guide rail support surface 713, the clamping groove 712 for cooperating with the clamping unit 73 to make the connection of the guide rail 71 more stable, the support surface for connecting the guide rail rubber strip 79, the end of the support surface away from the clamping groove 712 is provided with an upward hook to fit with the lock bolt bevel 632, the hook cannot limit and protect the guide rail rubber strip 79, but also make the bed cover more convenient when to close. When closing, the lock bolt bevel 632 contacts the hook. as both are beveled, the hook squeezes the lock bolt to makes the lock bolt shrink first, when the whole lock bolt passes through the hook, lock bolt reset under the action of the spring, at this time the guide rail support surface 713 limits the lock bolt.

The clamping unit 73 includes a first clamping block 731, a second clamping block 732 and a tightening screw 733, the first clamping block 731 and second clamping block 732 are respectively located on both sides of the guide rail 71, the first clamping block 731 and the second clamping block 732 are connected by bolt, the second clamping block 732 is "L" shaped, the tightening screw 733 is connected to the bottom of the second clamp block 732 and against to the first clamp block 731.

When installing, first place the first clamping block 731 and the second clamping block 732 on both sides of the clamping groove 712, then connect the first clamping block 731 and the second clamping block 732 through bolts, and finally place the second clamping block 732 is connected to the tightening screw 733 to tighten the first clamping block 731.

The large front lock system 4 is connected with a support pad 5.

The present invention is not limited to the above-mentioned optional embodiment, anyone can produce various other forms under the inspiration of the present invention. However, regardless of changes in its shape or structure, all technical solutions that fall within the scope defined by the claims of the present invention fall within the scope of protection of the present invention.

What is claimed is:

1. A semi-embedded bed cover, comprising a panel body (1) connected to a cargo box, wherein the panel body (1) is connected to the cargo box by a dual linkage lock system (6) and a guide rail support bar system (7), and the panel body comprises a front railing (4), a first panel body (11), a second panel body (12) and a third panel body (13); one end of the first panel panel (11) is connected to the front railing (4), and the other end of the first panel body (11) is connected to the second panel body (12) by a rotating shaft system (2); the second panel body (12) is connected to the third panel body (13) by the rotating shaft system (2), and one end of the third panel body (13) away from the second panel body (12) is connected to a system of a rear railing with lock (3);

the guide rail support bar system (7) is connected to the cargo box;

the rotating shaft system (2) comprises an intermediate bar (22) and two rotating bars (21), the two rotating bars (21) being rotatably connected to the intermediate bar (22), the rotating bars (21) and the intermediate bar (22) snapping into each other, the rotating bars (21) rotating around the intermediate bar (22);

the dual linkage lock system (6) is used to connect the panel bodies with the guide rail support bar system (7), and the dual linkage lock system (6) comprises a profile connected to the panel body (1); the profile is provided with a profile groove (67), both ends of the profile groove (67) are connected to a lock bolt assembly, and the two lock bolt assemblies are connected to each other by a steel wire rope (68); the dual linkage lock system (6) comprises a handle base (66), and the handle base (66) is provided with two connecting holes (662); the handle ring (65) is provided with a restriction groove and two wire passing holes (651), the two wire passing holes (651) are respectively disposed at both ends of the restriction groove, and the connecting holes (662) and the wire passing holes (651) are disposed in a one-to-one correspondence.

2. The semi-embedded bed cover according to claim 1, wherein the dual linkage lock system (6) comprises a lock head (63) and a spring (62); the lock head (63) comprises a locking end and a connecting end, the locking end comprises a protrusion (631) and a latch bevel (632), and the connecting end is provided with a mounting hole (612); the positioning block (61) is disposed in the mounting hole (612), the positioning block (61) is connected to a circular shaft, and the spring (62) is sleeved on the circular shaft.

3. The semi-embedded bed cover according to claim 1, wherein left and right ends of the panel body (1) are connected to a longitudinal side railing system (8).

4. The semi-embedded bed cover according to claim 1, wherein the guide rail support bar system (7) comprises a guide rail (71), a clamping unit (73) and a front railing guide rail fixing block (72); the clamping unit (73) is used to connect the guide rail (71) and an edge of the cargo box, and the front railing guide rail fixing block (72) uses screws to hold the guide rail (71) in place and plays a fixed positioning role.

5. The semi-embedded bed cover according to claim 4, wherein the guide rail support bar system (7) further comprises a support rod (74), a support rod fixing block (78), and a fixing bracket (77); the support rod (74) is connected to the guide rail (71) through the support rod fixing block (78), the fixing bracket (77) is connected to the guide rail (71), and the fixing bracket (77) is snapped into the middle of the support rod (74), one end of the support rod (74) away from the support rod fixing block (78) being connected to an installation head (75).

6. The semi-embedded bed cover according to claim 5, wherein the guide rail (71) is provided with a clamping groove (712) and a guide rail support surface (713); the clamping groove (712) is used to cooperate with the clamping unit (73), the guide rail support surface (713) is used to connect a guide rail rubber strip (79), and one end of the guide rail support surface (713) away from the clamping groove (712) is provided with an upward hook.

7. The semi-embedded bed cover according to claim 6, wherein the clamping unit (73) comprises a first clamping block (731), a second clamping block (732), and a tightening bolt (733); the first clamping block (731) and the second clamping block (732) are located on both sides of the guide rail (71), and the first clamping block (731) and the second clamping block (732) are connected with each other by bolts; the second clamping block (732) is "L" shaped, and the tightening bolt (733) is connected to a bottom of the second clamping block (732) and abuts against the first clamping block (731).

8. The semi-embedded bed cover according to claim 4, wherein the front railing guide rail fixing block (72) comprises a connecting portion (721) and a restriction portion (722); the connecting portion (721) is connected to the guide rail support surface (713) by screws, and the restriction portion (722) is snapped into the front railing (4).

* * * * *